(No Model.) 2 Sheets—Sheet 1.
J. J. WOOD.
Magneto-Electric Machine.
No. 231,745. Patented Aug. 31, 1880.
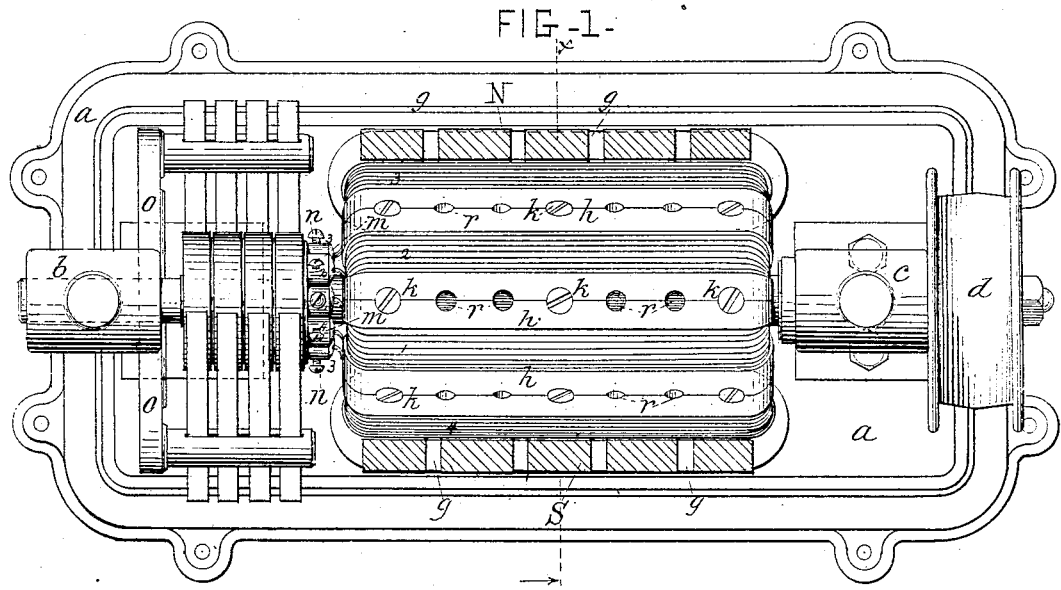
FIG.-1-
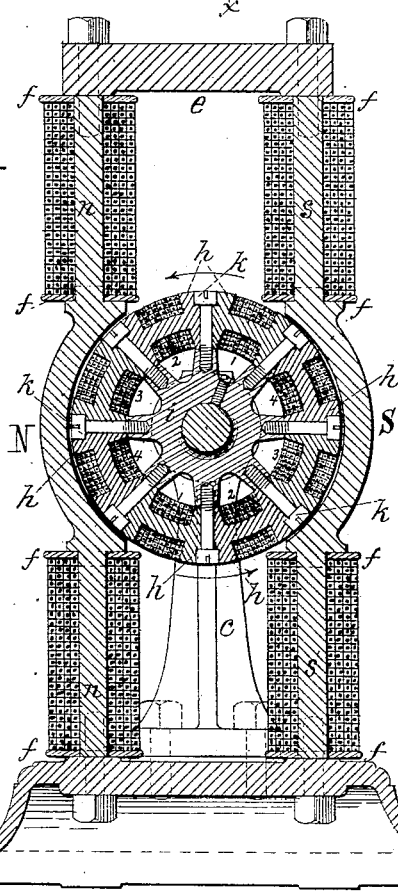
FIG.-2-
ATTEST=
Chas. M. Higgins
Jno. E. Gavin
INVENTOR=
James J. Wood
by S. W. Wales for
Attys.
N. PETERS, PHOTO-LITHOGRAPHER, WASHINGTON, D.C.

(No Model.) 2 Sheets—Sheet 2.
J. J. WOOD.
Magneto-Electric Machine.
No. 231,745. Patented Aug. 31, 1880.
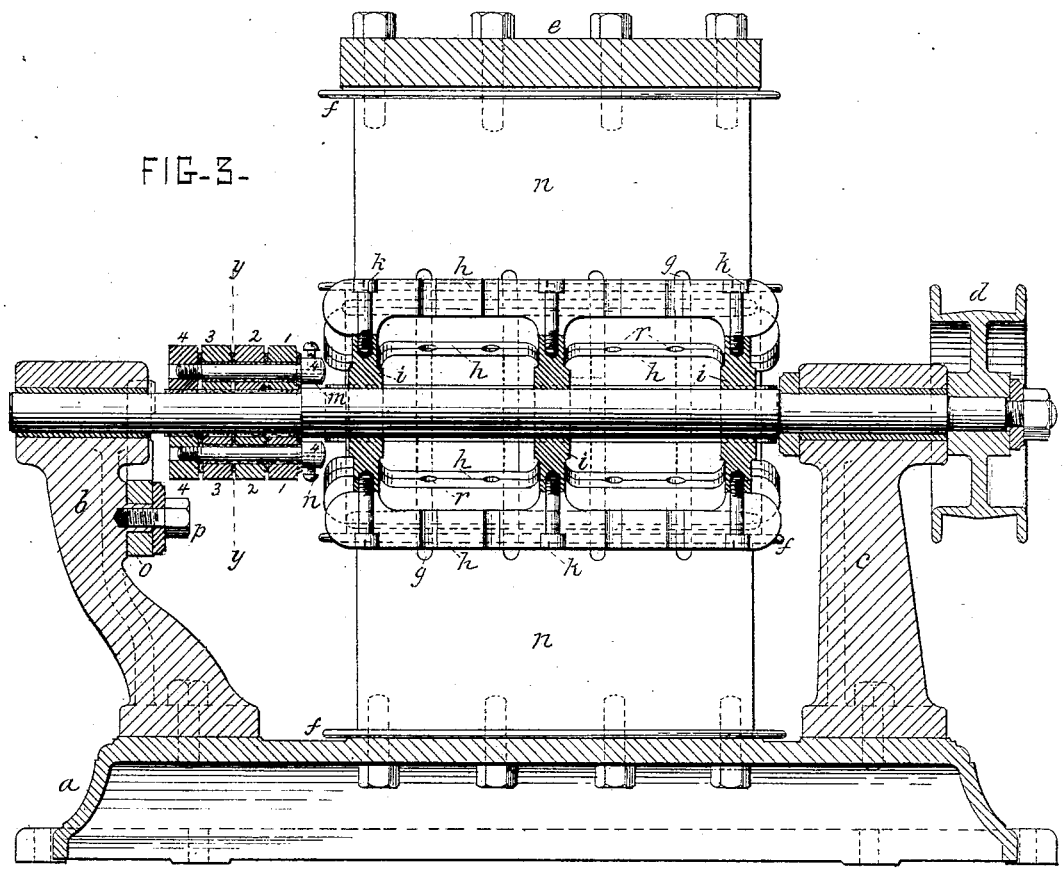
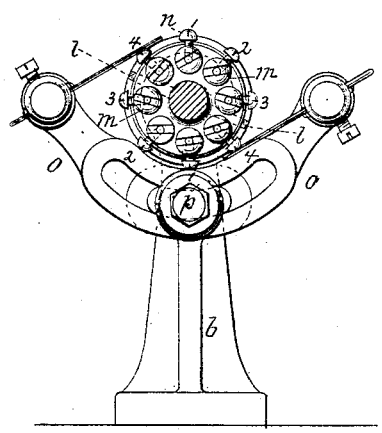
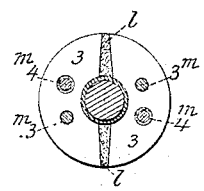
ATTEST: Chas. M. Higgins, Jno. E. Gavin
INVENTOR: James J. Wood by S. H. Wales, atty.

UNITED STATES PATENT OFFICE.

JAMES J. WOOD, OF BROOKLYN, ASSIGNOR TO THE FULLER ELECTRICAL COMPANY, OF NEW YORK, N. Y.

MAGNETO-ELECTRIC MACHINE.

SPECIFICATION forming part of Letters Patent No. 231,745, dated August 31, 1880.

Application filed April 10, 1880. (No model.)

*To all whom it may concern:*

Be it known that I, JAMES J. WOOD, of Brooklyn, Kings county, New York, have invented certain new and useful Improvements in Magneto-Electric or Electro-Magnetic Machines, of which the following is a specification.

My present invention applies more particularly to dynamo-electric generators, such as the Gramme or Siemens type, having an annular armature or a longitudinally-wound armature revolving between opposite poles of a powerful magnet; and my improvements aim to provide a compact and energetic machine of this kind, which, while possessing a simple, convenient, and neat mechanical construction, shall also economize the magnetic and electric forces to the best advantage.

To these ends the main features of my invention are embodied in a sectional construction of the annular armature, whereby any portion or coil-segment thereof may be removed without disturbing the rest, and also in certain improvements in the commutator and its spring-holder, whereby greater simplicity of construction and efficiency of action are secured, as hereinafter fully set forth.

In the annexed drawings, Figure 1 presents a plan view of my improved electric generator, showing the field-magnets in section. Fig. 2 is a transverse section on line $x\,x$, and Fig. 3 is a central longitudinal section thereof. Fig. 4 is an inner end elevation of the commutator and its spring-holder, &c. Fig. 5 is a cross-section of the commutator on line $y\,y$ of Fig. 3.

The base of the machine is indicated by $a$, and is preferably made of cast-iron in an oblong rectangular form, with marginal lugs for holding it on a supporting-bed, as illustrated. From each end of the base an upright arm, $b$ $c$, rises, which arms are provided with journal-bearings faced with gun-metal sleeves, in which each end of the armature-shaft is journaled, as seen best in Fig. 3.

The driving-pulley $d$ is keyed on the projecting end of the shaft outside the bearing $c$, and the commutator B is fixed on the opposite end of the shaft within the bearing $b$, while the armature D is placed about midway on the shaft between the commutator and the opposite bearing, $c$.

The armature is of an elongated annular or cylindrical form, and is longitudinally wound, and revolves close to the opposite poles, N S, of two powerful magnets. (Seen best in Fig. 2.)

For greater simplicity and clearness of illustration, the magnets and armature are shown wound only in Figs. 1 and 2 and naked in Fig. 3; and it will be readily understood that while I prefer to employ electro-magnets for the field or exciting magnets of the machine, yet permanent magnets may be used when desired, and the said electro-magnets may be energized by the current from the armature of the machine itself, or by a current from a separate source, the former being what I prefer to adopt.

The poles N S of the field-magnets are curved to correspond to the curve of the armature, and they each cover about one-third of its circumference on either side. Half of both magnets on each side is cast in one piece in the form of a thin wide web, $n'\,s\,N$, curved in the middle to form the poles N S and wound longitudinally at each end over the core portions $n\,s$. The lower edges of these magnet-core webs are bolted to the base, as shown, and they are joined together at the top by the rectangular plates $e$ bolted to the top edges of the cores. The plate $e$ thus forms the neutral section of the upper magnet, and the base $a$ the neutral section of the lower magnets, and both magnets thus merge into the poles N S, which are common to both, and which concentrate the magnetism of both in opposite polarities upon either side of the armature. Now, in order to get the greatest possible concentration of the magnetism at the poles, the poles are hence made the most salient part of the magnets, and all salient projections of magnetic metal at other points are avoided. Hence the flanges $f\,f$, which confine the energizing-coils of the magnet, are formed of brass or other non-magnetic substance, which are slipped on and secured to the iron cores, as seen best in Figs. 2 and 3.

In order to get a more uniform distribution of the magnetism longitudinally along the poles N S, the poles are slotted at intervals along their length with the usual vertical slots $g\,g$, as seen best in Figs. 1 and 3; but these slots terminate at the coiled portions, as shown.

The main novelty of my present invention, however, lies in the construction of the rotating armature. In these annular or cylindrical armatures, which are wound longitudinally or in the direction of their axis, the winding of the same, as heretofore constructed, has been a matter of some difficulty, and, moreover, when so wound, it is difficult to get access to any coil or section for examination or repair, should occasion require it, without detaching or unwinding a large portion of the armature. Now, according to my invention, I wind the several coils on separate similar and independent sections or segments, which may be afterward put together, like the stones of an arch, to complete the armature, and may then be coupled together and connected to the commutator according to any preferred or adopted system, and, moreover, any segment may be subsequently removed, should any occasion require it, without disturbing the rest. The outer or wound portion of the armature is hence made in a number of radial segments, $h\ h$, removably attached to the center portion or hub of the armature. These segments each contain a distinct coil, and may be of any suitable number, preferably six or eight, the latter number being shown. Each of these segments has a thin central core with projecting marginal flanges on either side, as seen in section in Fig. 2 and dotted lines in Fig. 3, and the wire of the coils is wound lengthwise of the segment or parallel to the axis of the armature in the depressions of the said segments around the central core and between the flanges thereof, as shown. The inner faces of the flanges are nearly parallel, as shown, so that the coils may lie in close parallel convolutions, while the outer faces of the flanges are radial and converge toward the center of the armature, and these faces closely junction together to form the complete cylindrical armature in distinctly-wound peripheral segments.

The hub of the armature is preferably formed of three disks, $i\ i$, fixed on the armature-shaft, one at the center and one at each end of the armature, and each having a series of short projecting radial arms or spokes corresponding in number to the number of the wound segments, to which the latter are secured by screws $k\ k$ passing through the junction-line of the segments and screwed into the arms of the hub, as seen best in Fig. 2. The holes for the fastening-screws are thus bored half on one section and half on the other, so that one set of screws serves to hold two segments, which conduces to simplicity and compactness.

The coil-segments $h\ h$ of the armature are, of course, made of soft iron, preferably soft cast-iron; but the armature hub or disks $i\ i$ are preferably made of brass or equivalent non-magnetic metal, so that all the magnetism of the armature is confined to the wound portion, and a much better effect thus obtained.

By this segmental construction of the armature it will be observed that each coil-section may be made alike and coiled separately, and hence the construction and coiling of the armature is thus greatly simplified and rendered more perfect. Moreover, these coiled segments may be put together and fastened to the hub of the armature in a very simple and secure manner, and may then be coupled to each other and to the commutator according to any desired arrangement; and, furthermore, any coil or segment may be subsequently removed for examination, repair, renewal, or other purpose without disturbing the others, thus forming a material improvement in the construction of this class of armatures.

The coiled segments, when fastened in place upon the armature, may be coupled together in continuous series in what is known as the "Gramme" or closed circuit, or they may be coupled in open circuit, or in any other preferred arrangement. I prefer, however, to couple the coils in the open circuit—that is, the outside ends of two diametrically-opposite coils are connected together and the two inside ends are connected respectively to each of two diametrically-opposite sections of the commutator, on which the commutator-springs bear at opposite sides in the usual manner.

Now, as there are eight coils shown in the present armature, the commutator has hence eight diametrical or semicircular sections connected in the described manner with the coils, and so placed angularly on the armature-shaft with reference to the coils, the magnets, and the commutator-springs as to properly blend the intermittent and opposite currents from the coils into one continuous current in about the usual manner, as will be readily understood.

The commutator is insulated from the armature-shaft by a non-conducting sleeve, as usual, and each pair of sections is also insulated from the next by non-conducting washers placed between them. Furthermore, each section of the commutator is separate from the other at the periphery on which the springs bear by a slot or non-conducting space, which slots correspond to the neutral points in the rotation of the armature-coils, as usual. These slots, however, which are usually left open, I fill with plugs or small slabs $l$ of solid non-conducting material, preferably ivory, which rise flush with the periphery of the commutator on which the springs bear, as seen best in Fig. 5. The contacting surface of the commutator is thus perfectly continuous and smooth, without any cavities, slots, or gaps, yet with the necessary non-conducting spaces at the neutral points.

This simple improvement is found to greatly increase the efficiency of the machine, for whereas in the ordinary open slotted or gapped commutator the springs have a tendency to jump at each gap, thus breaking contact for a moment of time, which, electrically considered, is serious, and hence causing an important loss in the transmission of the current, besides tending to increase sparking and to injure and more rapidly wear the springs and sections. By the described device, however, all jumping of the springs is prevented, and the contact thereof with the commutator-sections is perfect at all times; hence the current transmitted is found to have much more perfect continuity and greater force, while sparking is diminished and wear reduced.

The filling-plugs *l*, I prefer to make of dovetail section, widening inwardly and wedged in spaces of similar form between the commutator-sections, as seen best in Fig. 5, so that they cannot become dislodged by the centrifugal force of the rapid revolutions. It may also be observed that the sections of the commutator are secured together and the coil-wires connected thereto in a simple manner. Thus in Fig. 4 the heads of eight screws, *m m*, may be seen projecting from the inner end of the commutator toward the armature corresponding to the eight terminal wires of the armature-coils.

Now, the slotted head of each screw is perforated with a central hole to receive the end of a terminal wire, and the wire is held therein by a small screw, *n*, tapped radially through the side of the screw-head, as shown. Now, the larger screws *m* pass through the commutator-sections parallel with each other and with the axis of the commutator at equal intervals around the same, and the screws are of varying length corresponding to the nearness or remoteness of the section to which the terminal wires are intended to connect. Each screw therefore terminates in a distinct section by screwing tightly therein, thus bringing its corresponding coil-wire into metallic and electrical connection therewith, while the screw is insulated from all preceding sections by an insulating-sleeve inclosing the unthreaded part of the screw, and by a washer underlying the head of the screws, as best seen in Figs. 1 and 3, thus serving to bind all the sections securely together, as well as connecting the wires thereto in a simple and reliable manner, which also admits of ready detachment when required.

The commutator-springs project from two parallel arms on either side of the commutator in about the usual manner; but these arms extend from opposite ends of an adjustable arc, *o*, which is formed with a curved slot concentric with the axis of the commutator, and is supported on a curved projection cast on the bearing-arm *b* and clamped thereon by a stud, *p*. The arc may thus be shifted one way or the other on a curve concentric with the commutator to bring the springs to the desired adjustment. This adjustable arc I find preferable to the yoke mounted on the bearing heretofore used, as its construction and action are lighter, simpler, and generally more convenient, and it brings the connections nearer to the base, which is a further advantage, as will be readily appreciated.

I prefer to circulate the entire current from the armature through the magnet-coils before leaving the terminals of the machine by means of about the usual arrangement of connections, which is not necessary to describe; but of course this current may be divided, or the magnets may be charged by a separate current when desired.

It will be seen in Figs. 2 and 3 that the armature has substantially the form of a hollow cylinder with a light and open central frame. Hence any heat developed in the wound periphery will be quickly radiated; and to further conduce to the dissipation of such heat I prefer to bore a few holes, *r*, through the periphery at the junction-line of the segments, as seen in Figs. 1, 2, and 3, which will hence admit a centrifugal circulation and discharge of the air from the hollow center of the armature, and through the periphery against the magnets, thus preventing an undue heating of the parts.

I do not wish to infer any claim of novelty in the broad idea of an annular armature formed in distinct sections or segments joined together in annular form, as several instances of this may be given; but my invention, as already pointed out in the description, is distinguished in that each of the segments of my armature is fastened removably to the hub or axis and independently of the others, so that any segment or coil may be removed without disturbing the others, whereas in former armatures of this class the segments have been fastened collectively to end rings or collectively to the axis, or in some similar manner, so that the removal of one necessitates the detachment of all.

I might also refer to another class of sectional armatures, in which the sections project radially from the axis with their outer polar ends free and their inner polar ends attached to the axis, the windings being on the sides, each section adjoining each other radially on their wound sides, but not touching each other, or, in brief, like the wound spokes of a wheel, which is, of course, distinct from my invention, in which the sections are junctioned together in peripheral annular series, the windings being inside and outside of the sectional annular core, or, like the continuous rim of a wheel, made in junctioned fellies or segments, each segment containing a coil and each segment removably and independently fastened to the spokes or hub of the axis.

What I claim as my invention is—

1. An annular armature of the described kind, consisting of a central hub or axis with a sectional annular wound portion encircling the same, the sections of which are independently fastened to the hub or axis, whereby any section or coil may be removed without displacing the others, substantially as herein shown and described.

2. An annular or cylindrical armature wound longitudinally or in the direction of its axis in separate coils on distinct and independent cores of segmental or sectoral form, junctioned directly together in annular peripheral series, and each secured individually or independently to the hub or axis of the armature, substantially as herein set forth.

3. An annular or cylindrical armature formed in distinct peripheral sections junctioned directly together in annular series and secured to the hub or axis of the armature by screws passing through the junction-line of two meeting sections, substantially as herein shown and described.

4. A sectional annular armature formed of a central axial shaft and one or more hub-disks, $i\ i$, fixed thereon, with a peripheral series of segmental bobbins junctioned together in annular form and secured at intervals to said disks, substantially as herein shown and described.

5. The combination, with an armature having a series of distinct coils and a commutator formed with a corresponding series of sections, of a corresponding series of screws connecting with the respective sections, with their heads projecting from the end of the commutator and fitted with small radial clamp-screws to couple with the terminal wires of said coils, substantially as herein shown and described.

6. A circular rotating commutator formed of fractional circular sections having radial neutral spaces between their extremities of inwardly-widening or dovetailed form, with solid non-conducting plugs having a corresponding form, filling said spaces flush with the contacting surface of the sections, substantially as and for the purpose set forth.

JAMES J. WOOD.

Witnesses:
CHAS. M. HIGGINS,
EDWARD H. WALES.